US012669940B2

(12) United States Patent
Gopalakrishnan et al.

(10) Patent No.: US 12,669,940 B2
(45) Date of Patent: Jun. 30, 2026

(54) ERROR HANDLING IN ASYMMETRIC SUB-BLOCKS

(71) Applicant: SANDISK TECHNOLOGIES, INC., Milpitas, CA (US)

(72) Inventors: Raghavendra Gopalakrishnan, Bangalore (IN); Disha Gundecha, Pune (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/237,041

(22) Filed: Aug. 23, 2023

(65) Prior Publication Data

US 2024/0354007 A1     Oct. 24, 2024

Related U.S. Application Data

(60) Provisional application No. 63/461,400, filed on Apr. 24, 2023.

(51) Int. Cl.
G06F 3/06          (2006.01)
(52) U.S. Cl.
CPC .......... G06F 3/0616 (2013.01); G06F 3/0619 (2013.01); G06F 3/064 (2013.01); G06F 3/0679 (2013.01)
(58) Field of Classification Search
CPC ...... G06F 3/0616; G06F 3/0619; G06F 3/064; G06F 3/0679
See application file for complete search history.

(56) References Cited

U.S. PATENT DOCUMENTS

| | | | |
|---|---|---|---|
| 10,354,737 B2 | 7/2019 | Hu | |
| 10,832,790 B1 | 11/2020 | Bhatnagar | |
| 10,861,581 B2 * | 12/2020 | Park | G11C 7/1042 |
| 10,929,285 B2 | 2/2021 | R | |
| 11,456,050 B2 | 9/2022 | Chandramani | |
| 2008/0112238 A1 * | 5/2008 | Kim | G11C 11/5621 |
| | | | 365/185.09 |
| 2015/0103883 A1 * | 4/2015 | Wu | H04N 19/122 |
| | | | 375/240.02 |
| 2020/0040980 A1 | 2/2020 | Steven | |
| 2022/0413699 A1 * | 12/2022 | Luo | G06F 11/07 |

OTHER PUBLICATIONS

Chen Tseng-Yi, Yuan-Hao Chang, Chien-Chung Ho, Shuo-Han Chen; Enabling Sub-blocks Erase Management to Boost the Performance of 3D Nand Flash Memory; 2016, in Proceedings of the 53rd Annual Design Automation Conference Jun. 5 (pp. 1-6).

* cited by examiner

*Primary Examiner* — Yong J Choe
(74) *Attorney, Agent, or Firm* — Arlene Neal; NEAL BLIBO LLC

(57)          ABSTRACT
A storage device performs error handling using asymmetric blocks in a memory device. The memory may be divided into blocks of varying sizes. A controller on the storage device may process instructions by writing data to a first block on the memory device. If the controller determines an error occurred with a write operation to the first block and if the controller is unable to find a second block that is the same size as the first block, the controller may replace the first block with a second block that is larger than the first block. The controller may mark the second block and continue with the write operation.

17 Claims, 9 Drawing Sheets

100

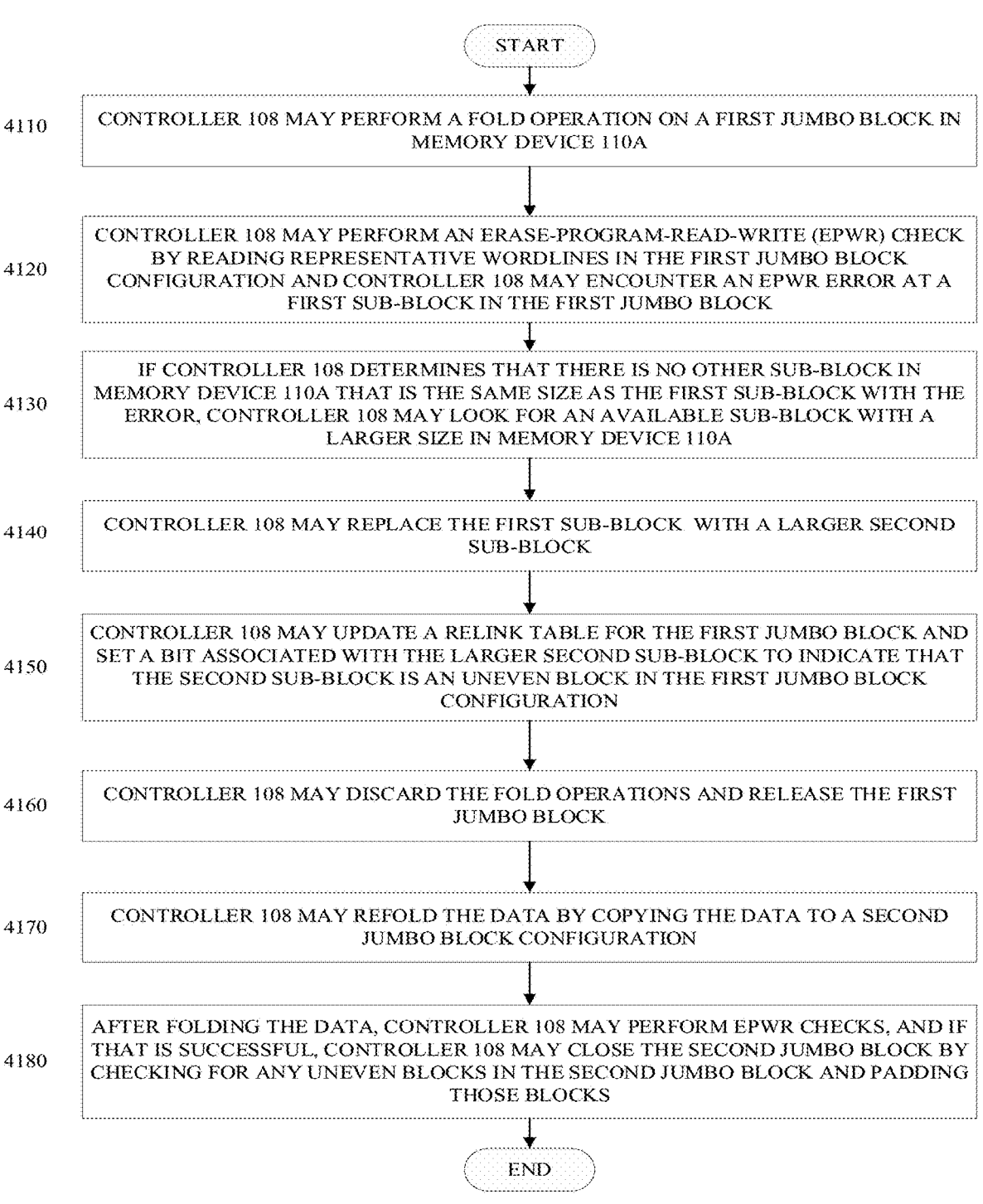

START

4110  CONTROLLER 108 MAY PERFORM A FOLD OPERATION ON A FIRST JUMBO BLOCK IN MEMORY DEVICE 110A

4120  CONTROLLER 108 MAY PERFORM AN ERASE-PROGRAM-READ-WRITE (EPWR) CHECK BY READING REPRESENTATIVE WORDLINES IN THE FIRST JUMBO BLOCK CONFIGURATION AND CONTROLLER 108 MAY ENCOUNTER AN EPWR ERROR AT A FIRST SUB-BLOCK IN THE FIRST JUMBO BLOCK

4130  IF CONTROLLER 108 DETERMINES THAT THERE IS NO OTHER SUB-BLOCK IN MEMORY DEVICE 110A THAT IS THE SAME SIZE AS THE FIRST SUB-BLOCK WITH THE ERROR, CONTROLLER 108 MAY LOOK FOR AN AVAILABLE SUB-BLOCK WITH A LARGER SIZE IN MEMORY DEVICE 110A

4140  CONTROLLER 108 MAY REPLACE THE FIRST SUB-BLOCK WITH A LARGER SECOND SUB-BLOCK

4150  CONTROLLER 108 MAY UPDATE A RELINK TABLE FOR THE FIRST JUMBO BLOCK AND SET A BIT ASSOCIATED WITH THE LARGER SECOND SUB-BLOCK TO INDICATE THAT THE SECOND SUB-BLOCK IS AN UNEVEN BLOCK IN THE FIRST JUMBO BLOCK CONFIGURATION

4160  CONTROLLER 108 MAY DISCARD THE FOLD OPERATIONS AND RELEASE THE FIRST JUMBO BLOCK

4170  CONTROLLER 108 MAY REFOLD THE DATA BY COPYING THE DATA TO A SECOND JUMBO BLOCK CONFIGURATION

4180  AFTER FOLDING THE DATA, CONTROLLER 108 MAY PERFORM EPWR CHECKS, AND IF THAT IS SUCCESSFUL, CONTROLLER 108 MAY CLOSE THE SECOND JUMBO BLOCK BY CHECKING FOR ANY UNEVEN BLOCKS IN THE SECOND JUMBO BLOCK AND PADDING THOSE BLOCKS

END

FIG. 4B

ERROR HANDLING IN ASYMMETRIC SUB-BLOCKS

CROSS-REFERENCE TO RELATED APPLICATION

The present application claims the benefit of U.S. Provisional Application Ser. No. 63/461,400 titled "ERROR HANDLING IN ASYMMETRIC SUB-BLOCKS," filed Apr. 24, 2023, which is incorporated by reference herein in its entirety.

BACKGROUND

In NAND flash memory devices, data may be written to the memory device in blocks, wherein each block may be divided into pages. When data is written to the memory device, the data may be written in pages and when data is erased from the memory device, the entire block of data may be erased. As technology improves, the numbers and sizes of blocks in these memory devices may vary.

In some technologies, a block may be divided into sub-blocks, wherein each sub-block is a fraction of the block, and each sub-block may be individually programmed and/or erased. For example, a block may be divided into two or three parts, each of which may be accessed or erased individually. Generally, sub-blocks are the same-sized blocks. However, in some Bit Cost Scalable (BiCS) technology such as BiCS8, sub-blocks may have different sizes.

When an error occurs while, for example, writing to the memory device, exception handling is typically performed by replacing the existing block/sub-block with the error with another block/sub-block of the same size. For example, if a program error or erase failure occurs when writing to one of the sub-blocks in the memory, the system may look for another sub-block of the same size, write the data to the other block, and update a relink table. If the available sub-blocks in the memory have different sizes than that of the sub-block having the error and there are no available sub-blocks that are the same size as the sub-block having the error, the existing exception handling scheme may not be implemented.

SUMMARY

In some implementations, a storage device may perform error handling using asymmetric blocks in a memory device. The memory may be divided into blocks/sub-blocks of varying sizes. A controller on the storage device may process instructions by writing data to a first block on the memory device. If the controller determines an error occurred with a write operation to the first block and if the controller is unable to find a second block that is the same size as the first block, the controller may replace the first block with a second block that is larger than the first block. The controller may mark the second block and continue with the write operation.

In some implementations, the controller may fold data to a first jumbo block on the memory device and perform an integrity check on the first jumbo block. If the controller determines that an error occurred during the integrity check, the controller may replace a first block in the first jumbo block with a second block that is larger than the first block. The controller may release the first jumbo block and perform a refold operation to a second jumbo block. The controller may close the second jumbo block if the refold operation is successful.

In some implementations, a method is provided for performing exception handling with asymmetric blocks in a storage device. The method includes processing, by the controller, data on a first block on the memory device and determining when there is an error with the processing. The method further includes replacing the first block with a second block that is larger than the first block, continuing with the processing, and marking the second block.

BRIEF DESCRIPTION OF THE SEVERAL VIEWS OF THE DRAWINGS

FIG. 4B is a flow diagram of an example process for exception handling with asymmetric blocks during an erase-program-read-write failure in accordance with some implementations.

Figure 1:
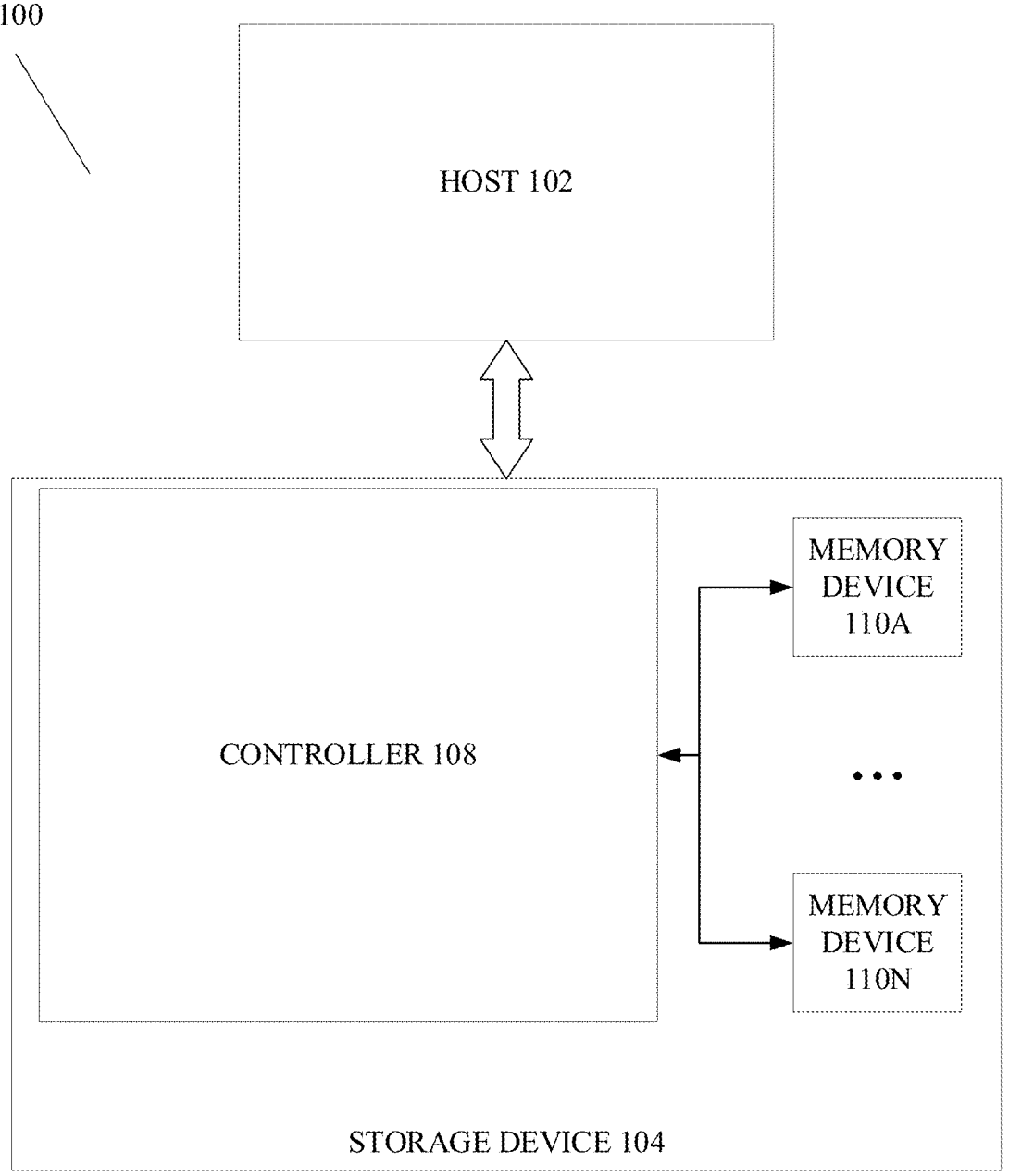
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a controller 108 and one or more non-volatile memory devices 110a-110n (referred to herein as memory device(s) 110). Storage device 104 may be, for example, a solid-state drive (SSD), and the like. Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based, including, for example, NAND flash memory. Memory device 110 may be included in storage device 104 or may be otherwise communicatively coupled to storage device 104. Data may be stored on memory device 110 in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

To increase performance, controller 108 may program data in a format storing fewer bits in each memory cell. Subsequently, when performing background operations, controller 108 may re-write the data from the format storing fewer bits in each memory cell into a format storing more bits in each memory cell, thus allowing the data to be stored more compactly and enabling memory device 110 to store more data. The process of moving the data from, for example, SLC memory cells to MLC memory cells is referred to herein as folding SLC data to MLC data.

Memory device 110 may be divided into blocks, wherein when data is erased from memory device 110, the entire block of data may be erased. Blocks in memory device 110 may also be divided into sub-blocks that may or may not be the same size. Although the sub-blocks are related, they may each be individually accessed and/or erased. The discussions in this disclosure about sub-blocks and/or blocks may be applicable to sub-blocks and full blocks in memory device 110.

Blocks in memory device 110 may be grouped together into a plane, and a die may include a single plane full of data blocks or multiple planes that have been linked together. The number and configurations of planes within a flash die may be adaptable. Multiple dies may also be configured to form a jumbo block, for example, an aggregation of blocks that is striped across channels, planes, and dies.

When controller 108 is writing data to memory device 110, controller 108 may encounter an error including, for example, a program failure, an erase failure, or an erase-program-write-read failure. The program failure may occur when controller 108 is writing data to memory device 110. The erase failure may occur when controller 108 is erasing blocks at an initial state. The erase-program-write-read failure may occur when controller 108 is performing integrity checks on representative wordlines in the blocks.

If controller 108 encounters, for example, a program failure or an erase failure, while writing data to a first sub-block in memory device 110*a*, controller 108 may determine if there is a second sub-block in memory device 110*a* that is the same size as the first sub-block. If controller 108 finds a same-sized available second sub-block, controller 108 may perform exception handling by replacing the first sub-block with the error with the available second sub-block, writing the data to the available second sub-block, and updating a relink table.

If controller 108 determines that there are no available same-sized sub-blocks in memory device 110*a*, but that there is an available second sub-block with a larger size, controller 108 may perform exception handling by replacing the first sub-block with the error with the larger second sub-block. Controller 108 may copy the contents from the first sub-block to the larger second sub-block and continue the write operation. Controller 108 may update the relink table with the larger second sub-block.

Controller 108 may mark the larger second sub-block to note that the second sub-block is not the same size (uneven size) as the other sub-blocks in a jumbo block configuration including the first sub-block with the error. For example, controller 108 may set a bit associated with the second sub-block to note that the second sub-block is not the same size as the other blocks in the jumbo block configuration. When closing the jumbo block, controller 108 may also pad any extra space in the second sub-block.

In some implementations, controller 108 may encounter an erase-program-read-write error when performing integrity checks after a fold operation. For example, when controller 108 folds SLC data to QLC format in a first jumbo block in memory device 110*a*, controller 108 may encounter an erase-program-read-write error when performing integrity checks. Controller 108 may determine if there is a second sub-block in memory device 110*a* that is the same size as the first sub-block where the error occurred in the first jumbo block. Controller 108 may determine that there is no other sub-block in memory device 110*a* that is the same size as the first sub-block with the error. Controller 108 may look for an available second sub-block with a larger size in memory device 110*a*. Controller 108 may replace the first sub-block with the error with the larger second sub-block. Controller 108 may update a relink table for the first jumbo block and set a bit associated with the second sub-block to indicate that the second sub-block is an uneven block (i.e., not the same size as the other blocks/sub-blocks) in the first jumbo block. Controller 108 may discard the fold operations and release the first jumbo block.

Controller 108 may refold the data by copying the data to, for example, a second jumbo block. After folding the data, controller 108 may perform erase-program-read-write checks, and if that is successful, controller 108 may close the second jumbo block by checking for any uneven blocks (i.e., blocks with different sizes) in the second jumbo block. Controller 108 may pad extra space in the uneven blocks when closing the second jumbo block.

When controller 108 folds the data from a format with fewer bits in each cell to a format with more bits in each cell, controller 108 may not need to rewrite the logical-to-physical table content. Controller 108 also may not need to recompute XOR data (i.e., parity content written at the end of the block). Controller 108 may also handle several mixed SLC source block sizes to be folded to MLC/QLC/TLC blocks with single or multiple relinks per block.

In some implementations, if larger-sized blocks/sub-blocks are available on memory device 110, memory device 110 may also not enter a read-only mode (i.e., an end-of-device state) for lack of available blocks/sub-blocks of a given size. As technology improves, if the number of blocks in a memory device decreases, by using blocks of varying sizes, controller 108 may maximize the use of all the blocks in the memory device.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

Figure 2A:
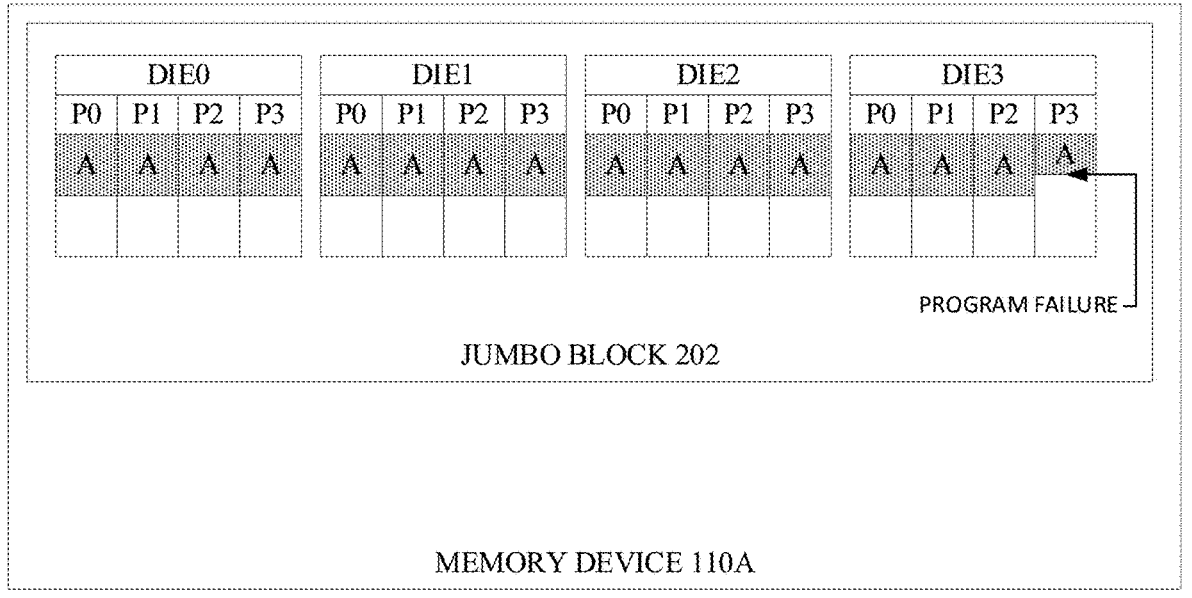
FIGS. 2A-2C are schematic block diagrams of asymmetric blocks in an example memory device used in exception handling in accordance with some implementations.
Figure 2B:
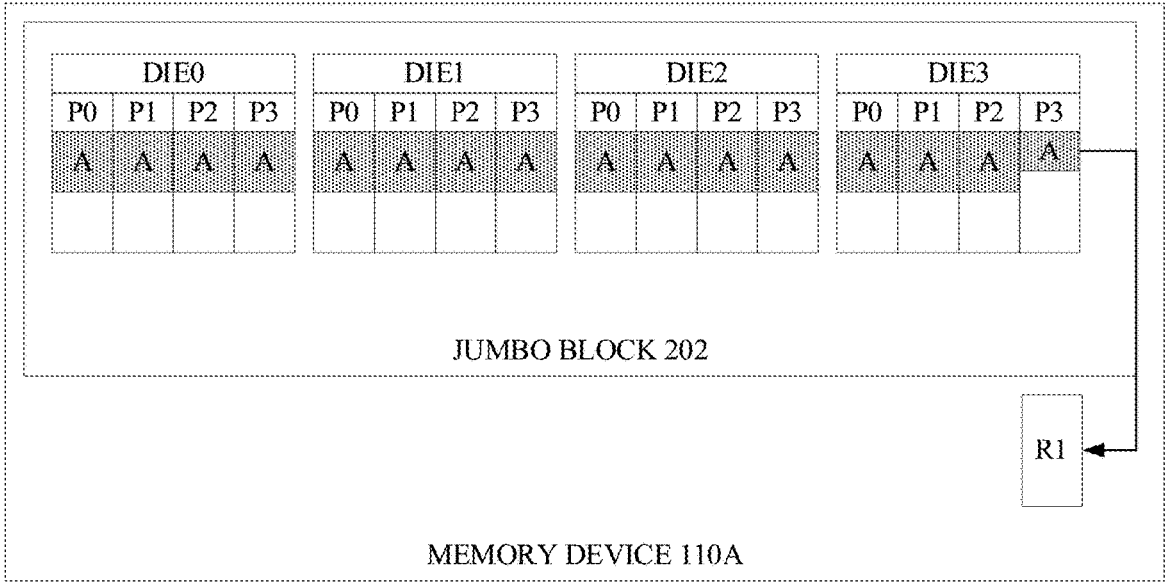
Figure 2C:
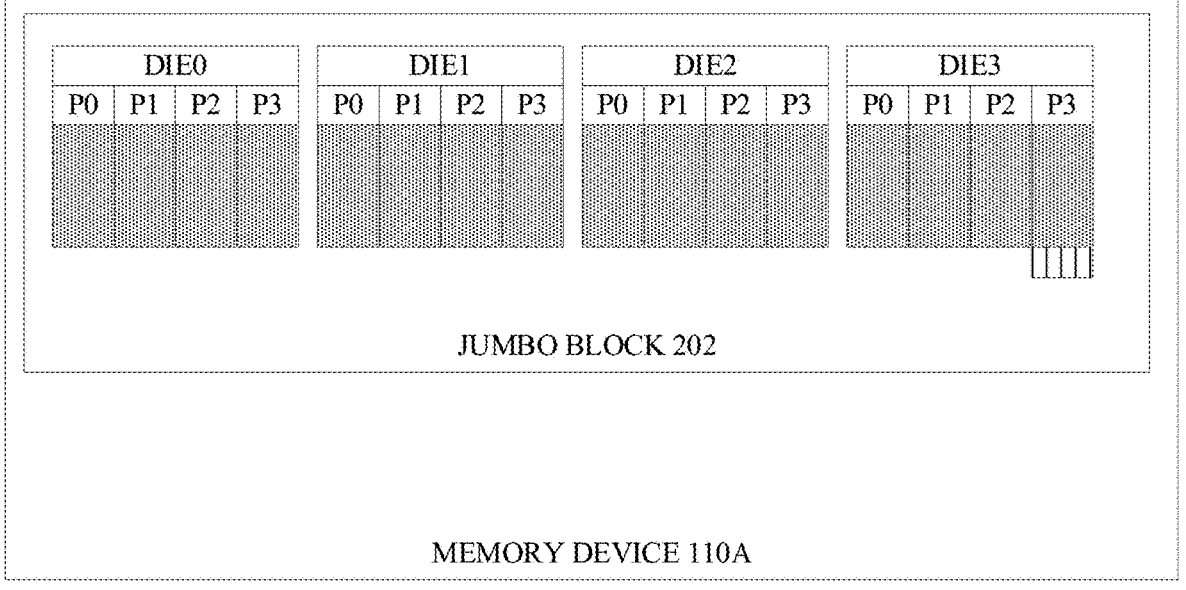

FIGS. 2A-2C are schematic block diagrams of asymmetric blocks in an example memory device used in exception handling in accordance with some implementations. Blocks in memory device 110a may be divided into sub-blocks that may or may not be the same size. For example, the blocks in memory device 110a may be divided into sub-blocks A, wherein the size of sub-blocks A may be 112 wordlines (WL) with six strings per WL.

Memory device 110a may include four dies (Die0, Die1, Die2, and Die3), each of which includes four planes (P0, P1, P2, and P3). The four dies in memory device 110a may form a jumbo block 202, wherein when controller 108 receives data from host 102 or when controller performs a relocations operation, controller 108 may start writing the data in the A sub-blocks starting at Die0/P0 and ending at Die3/P3, as shown by the shaded portions of memory device 110a.

If controller 108 encounters, for example, a program failure or erase failure, when writing to sub-block A in Die3/P3 and determines that there is no other sub-block in memory device 110a that is the same size as sub-block A in Die3/P3, controller 108 may look for an available sub-block with a larger size in memory device 110a. For example, controller 108 may determine that available sub-block R1 has a size of 118 WL with six strings per WL. Controller 108 may replace sub-block A in Die3/P3 with sub-block R1, copy the contents from sub-block A in Die3/P3 to block R1, and continue the write operation, as shown in 2B.

Controller 108 may mark the physical sub-block R1 to note that sub-block R1 is not the same size as the other blocks in jumbo block 202. Controller 108 may update a relink table with sub-block R1. When closing jumbo block 202, controller 108 may also pad sub-block R1, as shown with the diagonal lines in FIG. 2C, and close the relinked physical sub-block R1. For example, controller 108 may pad sub-block R1 with dummy content and send jumbo block 202 to a closed pool. FIGS. 2A-2C are provided as examples. Other examples may differ from what is described in FIGS. 2A-2C.

Figure 3A:
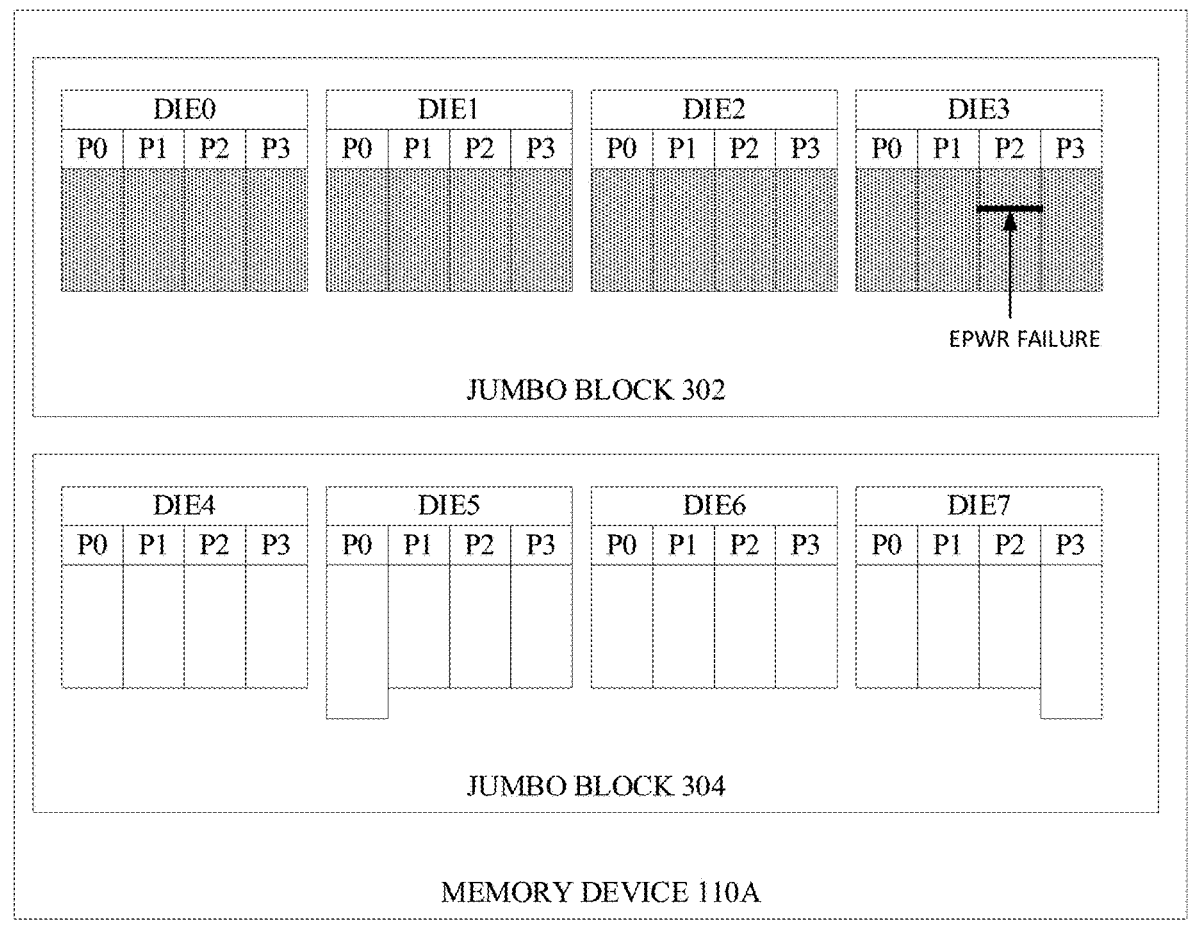
FIGS. 3A-3C are schematic block diagrams of asymmetric blocks used in exception handling during a fold operation in accordance with some implementations.
Figure 3B:
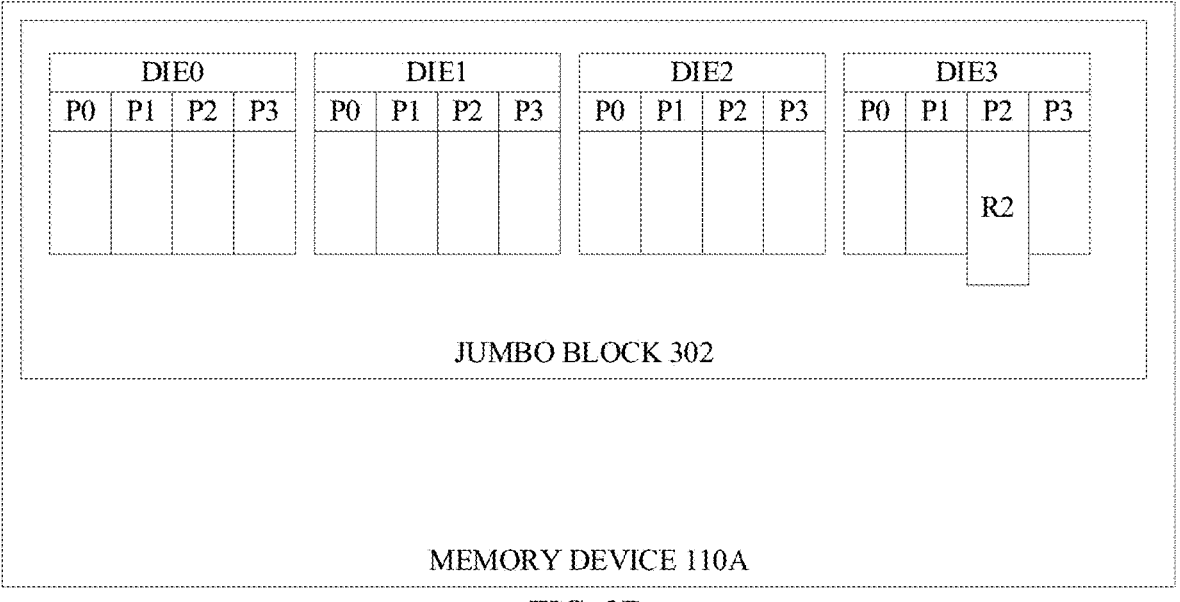
Figure 3C:
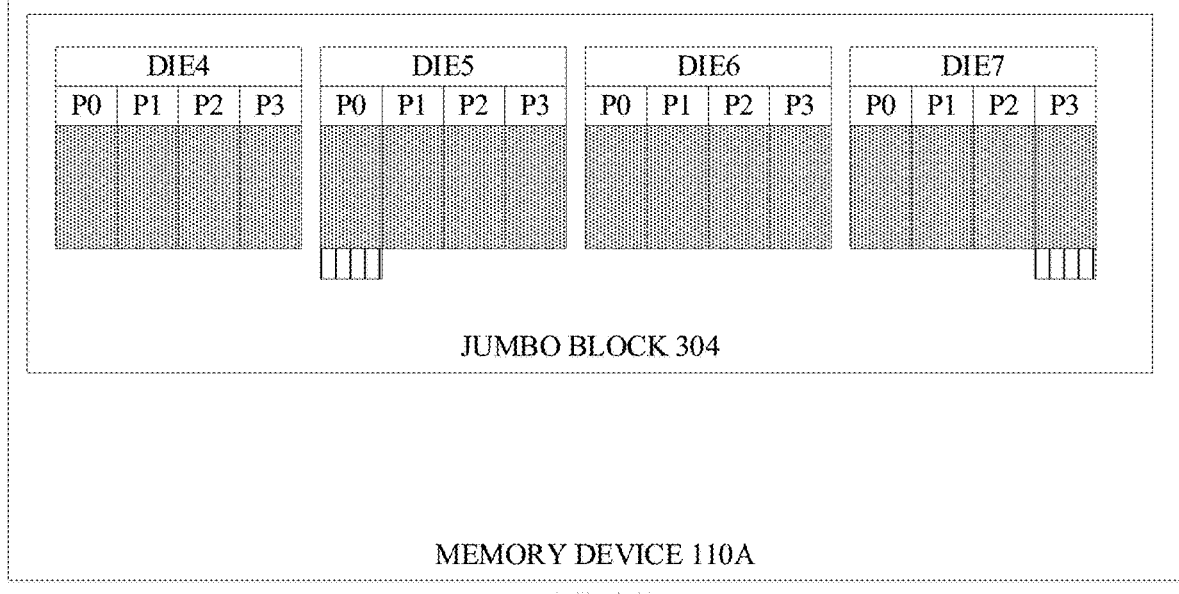

FIGS. 3A-3C are schematic block diagrams of asymmetric blocks used in exception handling during a fold operation in accordance with some implementations. FIGS. 3A-3C continue with the example where blocks in memory device 110a are divided into sub-blocks that may or may not be the same size. Memory device 110a may include dies (Die0, Die1, Die2, Die3, Die4, Die5, Die6, and Die7), each of which includes four planes (P0, P1, P2, and P3). The blocks in four dies in memory device 110a may form jumbo blocks 302 and 304. During background operation, controller 108 may fold SLC data into QLC data in jumbo block 302. Controller 108 may perform an erase-program-read-write (EPWR) check by reading representative wordlines in jumbo block 302 and controller 108 may encounter an EPWR error at, for example, Die3/P2, as shown in FIG. 3A.

If controller 108 determines that there is no other sub-block in memory device 110a that is the same size as the sub-block in Die3/P2, controller 108 may look for an available sub-block with a larger size in memory device 110a. For example, controller 108 may determine that available sub-block R2 has a size of 118 WL with six strings per WL. Controller 108 may replace the sub-block in Die3/P2 with sub-block R2, as shown in FIG. 3B. Controller 108 may update a relink table for jumbo block 302 and set a bit associated with sub-block R2 to indicate that sub-block R2 is an uneven block in jumbo block 302. Controller 108 may discard the fold operations and release Die0, Die1, Die2, and Die3 (i.e., jumbo block 302).

Controller 108 may refold the SLC data to QLC data by copying the SLC data to, for example, Die4, Die5, Die6, and Die7 in jumbo block 304. After folding the SLC to QLC data, controller 108 may perform erase-program-read-write checks, and if that is successful, controller 108 may close block 304 by checking for any uneven blocks (i.e., blocks with different sizes) in jumbo block 304. For example, controller 108 may determine that the blocks Die5/P0 and Die7/P3 are uneven blocks and may pad those blocks when closing jumbo block 304, as shown with the diagonal lines in FIG. 3C. FIGS. 3A-3C are provided as examples. Other examples may differ from what is described in FIGS. 3A-3C.

Figure 4A:
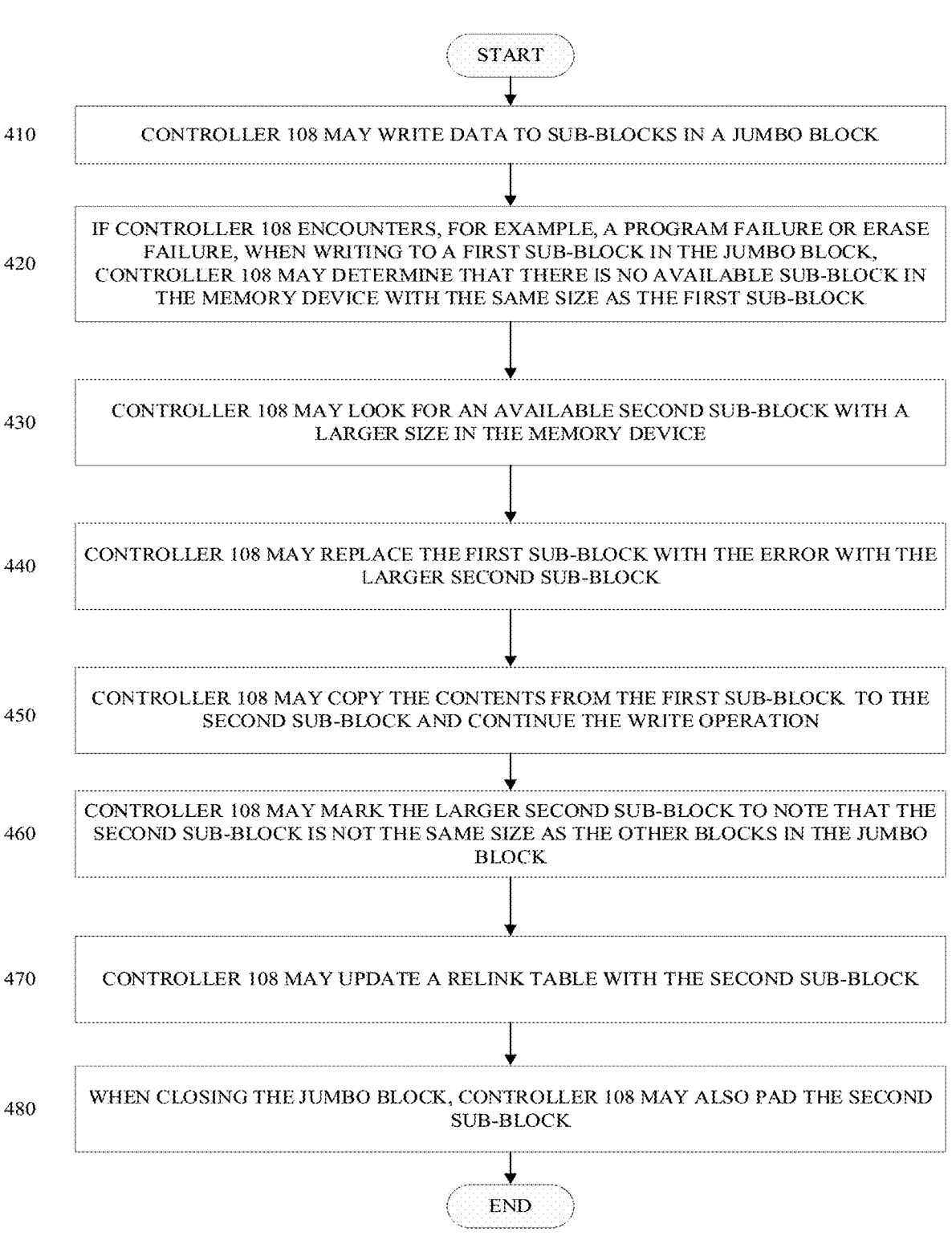
FIG. 4A is a flow diagram of an example process for performing error handling with asymmetric blocks in a memory device in accordance with some implementations.

FIG. 4A is a flow diagram of an example process for error handling using asymmetric blocks in a memory device in accordance with some implementations. At 410, controller 108 may write data to sub-blocks in a jumbo block. At 420, if controller 108 encounters, for example, a program failure or erase failure, when writing to a first sub-block in the jumbo block, controller 108 may determine that there is no available sub-block in the memory device with the same size as the first sub-block. At 430, controller 108 may look for an available second sub-block with a larger size in the memory device. At 440, controller 108 may replace the first sub-block with the error with the larger second sub-block. At 450, controller 108 may copy the contents from the first sub-block to the second sub-block and continue the write operation. At 460, controller 108 may mark the larger second sub-block to note that the second sub-block is not the same size as the other blocks in the jumbo block. At 470, controller 108 may update a relink table with the second sub-block. At 480, when closing the jumbo block, controller 108 may also pad the second sub-block.

FIG. 4B is a flow diagram of an example process for error handling using asymmetric blocks during an erase-program-read-write failure in accordance with some implementations. At 4110, controller 108 may perform a fold operation on a first jumbo block in memory device 110a. At 4120, controller 108 may perform an erase-program-read-write (EPWR) check by reading representative wordlines in the first jumbo block configuration and controller 108 may encounter an EPWR error at a first sub-block in the first jumbo block.

At 4130, if controller 108 determines that there is no other sub-block in memory device 110a that is the same size as the first sub-block with the error, controller 108 may look for an available sub-block with a larger size in memory device 110a. At 4140, controller 108 may replace the first sub-block with a larger-second sub-block. At 4150, controller 108 may update a relink table for the first jumbo block and set a bit associated with the larger second sub-block to indicate that the second sub-block is an uneven block in the first jumbo block configuration. At 4160, controller 108 may discard the fold operations and release the first jumbo block.

At 4170, controller 108 may refold the data by copying the data to a second jumbo block configuration. At 4180, after folding the data, controller 108 may perform erase-program-read-write (EPWR) checks, and if that is successful, controller 108 may close the second jumbo block by checking for any uneven blocks in the second jumbo block and padding those blocks. FIGS. 4A and 4B are provided as examples. Other examples may differ from what is described in FIGS. 4A and 4B.

Figure 5:
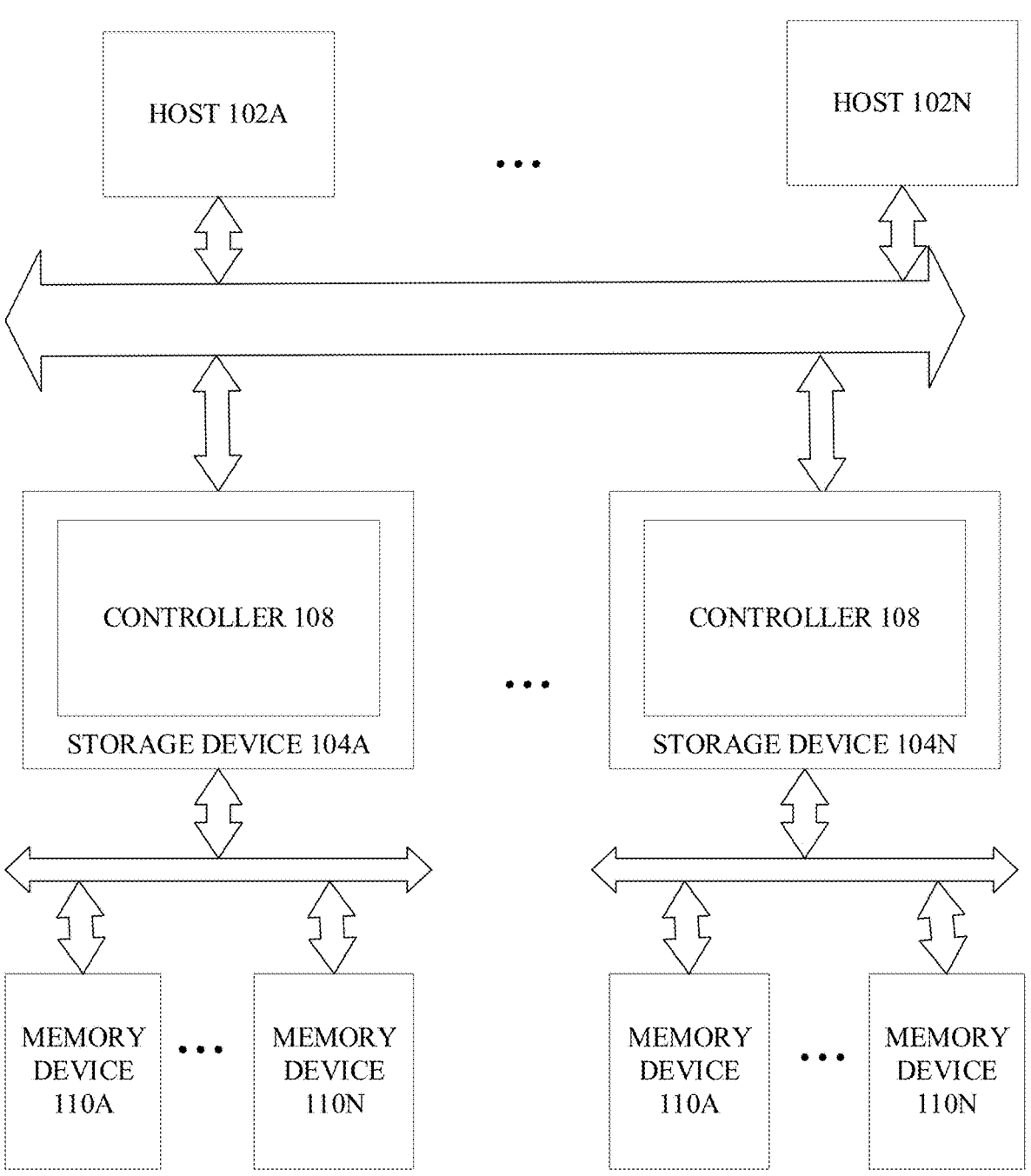
FIG. 5 is a diagram of an example environment in which systems and/or methods described herein are implemented.

FIG. 5 is a diagram of an example environment in which systems and/or methods described herein are implemented. As shown in FIG. 5, environment 500 may include hosts 102-102*n* (referred to herein as host(s) 102), and storage devices 104*a*-104*n* (referred to herein as storage device(s) 104).

Storage device 104 may include a controller 108 to manage the resources on memory device 110. Hosts 102 and storage devices 104 may communicate via Non-Volatile Memory Express (NVMe) over peripheral component interconnect express (PCI Express or PCIe) standard, the Universal Flash Storage (UFS) over Unipro, or the like. Devices of environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
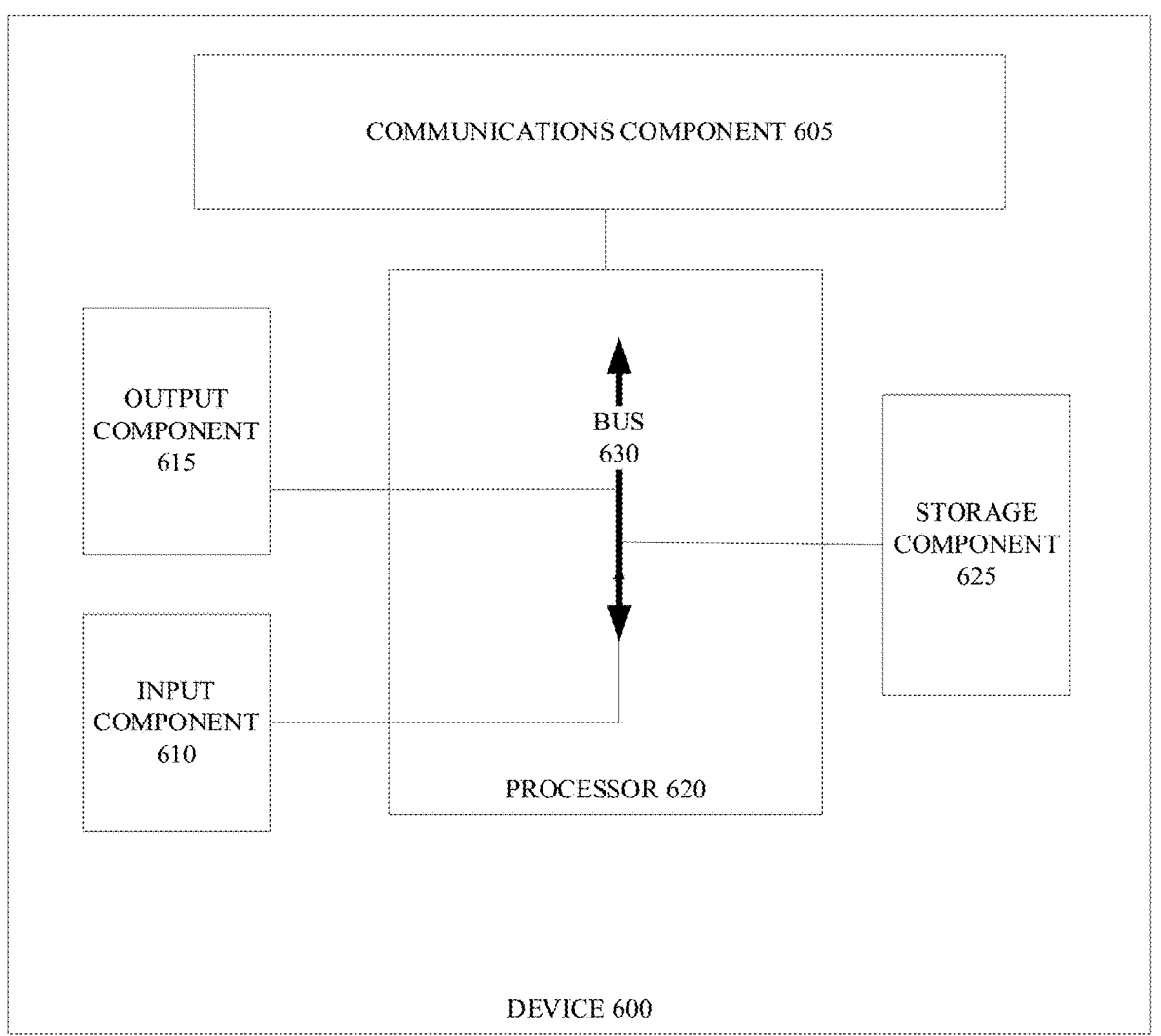
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a "combination of" hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" Furthermore, as used herein, the term "set" is intended to include one or more items (e.g., related items, unrelated items, a combination of related items, unrelated items, and/or the like), and may be used interchangeably with "one or more," The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to perform error handling using asymmetric blocks in a memory device, the storage device comprising:
   a memory device to store data, wherein the memory device is divided into blocks of varying sizes; and
   a controller to process instructions by writing to a first block on the memory device and determine when there is an error with a write operation to the first block, to replace the first block with a second block that is larger than the first block, to continue with the write operation, and to mark the second block, wherein the first block and the second block are programmed in a same format to store a given number of bits per cell and wherein the controller marks the second block by setting a bit associated with the second block to indicate an uneven size of the second block in a jumbo block configuration.

2. The storage device of claim 1, wherein the error is one of a program failure and an erase failure.

3. The storage device of claim 1, wherein the controller continues the write operation by copying contents from the first block to the second block.

4. The storage device of claim 1, wherein the controller pads available space in the second block and closes the second block after the jumbo block is closed.

5. The storage device of claim 1, wherein the controller replaces the first block with the second block by updating a relink table with the second block.

6. A storage device to perform error handling using asymmetric blocks in a memory device, the storage device comprising:
   a memory device to store data, wherein the memory device is divided into blocks of varying sizes; and
   a controller to fold data to a first jumbo block on the memory device, perform an integrity check on the first jumbo block, determine when there is an error during the integrity check, replace a first block in the first jumbo block with a second block that is larger than the first block, perform a refold operation to a second jumbo block and close the second jumbo block if the refold operation is successful, wherein the first block and the second block are programmed in a same format to store a given number of bits per cell and wherein the controller sets a bit associated with the second block to indicate an uneven size of the second block in the first jumbo block.

7. The storage device of claim 6, wherein the error is an erase-program-read-write error.

8. The storage device of claim 6, wherein the controller replaces the first block with the second block by updating a relink table with the second block.

9. The storage device of claim 6, wherein the controller releases the first jumbo block.

10. The storage device of claim 6, wherein in closing the second jumbo block, the controller checks for uneven blocks in the second jumbo block and pads extra space in an uneven block in the second jumbo block.

11. The storage device of claim 6, wherein the controller maintains content in a logical-to-physical table and parity content at end of blocks.

12. A method for using asymmetric blocks during exception handling in a storage device, the storage device having a memory device to store data and a controller to process data on the memory device, the method comprises:

processing, by the controller, data on a first block on the memory device, wherein the first block is programmed in a format to store a given number of bits per cell;

determining, by the controller, when there is an error with the processing;

replacing, by the controller, the first block with a second block that is larger than the first block, wherein the second block is programmed in the same format as the first block;

continuing, by the controller, with the processing;

marking, by the controller, the second block by setting a bit associated with the second block to indicate an uneven size of the second block in a jumbo block; and padding available space in the second block, and closing the second block after the jumbo block is closed.

13. The method of claim 12, wherein when the error is one of a program failure and an erase failure, the processing comprises writing the data to the first block, and the continuing comprises updating a relink table with the second block and continuing a write operation by copying contents from the first block to the second block.

14. The method of claim 12, wherein when the error is an erase-program-read-write error, the processing comprises folding data to a first jumbo block on the memory device, performing an integrity check on the first jumbo block, and determining when there is the error during the integrity check on the first block in the first jumbo block.

15. The method of claim 14, wherein replacing further comprises releasing the first jumbo block.

16. The method of claim 14, wherein continuing comprises performing a refold operation to a second jumbo block and closing the second jumbo block if the refold operation is successful.

17. The method of claim 16, wherein closing the second jumbo block comprises checking for uneven blocks in the second jumbo block and padding extra space in an uneven block in the second jumbo block.

* * * * *